United States Patent [19]
Allebach et al.

[11] Patent Number: 5,812,744
[45] Date of Patent: Sep. 22, 1998

[54] JOINT DESIGN OF DITHER MATRICES FOR A SET OF COLORANTS

[75] Inventors: Jan P. Allebach, Lafayette, Ind.; Qian Lin, Santa Clara, Calif.

[73] Assignee: Hewlett Packard Company, Palo Alto, Calif.

[21] Appl. No.: 641,304

[22] Filed: Apr. 30, 1996

[51] Int. Cl.$^6$ ........................................... H04N 1/52
[52] U.S. Cl. ................ 395/109; 358/534; 358/535
[58] Field of Search ........................ 395/109; 358/534, 358/536, 535, 456, 457, 460, 298

[56] References Cited

U.S. PATENT DOCUMENTS

| | | | |
|---|---|---|---|
| 4,149,194 | 4/1979 | Holladay . | |
| 4,700,235 | 10/1987 | Gall | 358/535 |
| 4,924,301 | 5/1990 | Surbrook | 358/534 |
| 4,987,498 | 1/1991 | Shimazaki . | |
| 5,166,809 | 11/1992 | Surbrook | 358/456 |
| 5,341,228 | 8/1994 | Parker et al. | 358/534 |

OTHER PUBLICATIONS

J.P. Allebach, et al., Model–Based Halftoning via Direct Binary Search, May 1994, IS&T's 47th Annual Conference, Rochester, NY, pp. 1–8.

T.J. Flohr, et al., Model Based Color Image Quantization, Sep. 1993, SPIE, vol. 1913, pp. 270–281.

M. A. Seldowitz, et al., Synthesis Of Digital Holograms By Direct Binary search, Jul. 1987, Applied Optics, vol. 26, No. 14, pp. 2788–2798.

A. Perumal, et al., Color Digital Halftoning Using Black And Secondary Color Replacement, USPTO Ser. No. 08/438,294, Filed May 10, 1995, pp. 1–23 & 9 sheets of drawings.

Q. Lin, et al., System And Method For Generating Calibrated Dither Matrices, USPTO Ser. No. 08/308,321, filed Sep. 19, 1994, pp. 1–30 & 16 sheets of drawings.

M. Analoui, et al., Model Based Halftoning Using Direct Binary Search, SPIE vol. 1666 Human Vision, Visual processing, and Digital Display III, 1992, pp. 96–108.

*Primary Examiner*—Scott Rogers
*Attorney, Agent, or Firm*—Denise A. Lee

[57] ABSTRACT

The present invention provides a system and method for generating halftone patterns. Typically the generated halftone patterns are used for generating dither matrices to halftone a image with improved visual quality. The steps for generating a plurality of color halftone patterns include: defining a color path from a color concentration level p to a color concentration level q; and generating a halftone patterns $f_j$ for each color concentration level j along the defined color path. After the halftone pattern $f_j$ is generated for the color concentration level j, the color fluctuation of the halftone pattern $f_j$ is minimized. A key contribution of the current invention is the decomposition of a color halftone pattern which occurs during the step of minimizing the color fluctuation for halftone pattern $f_j$, and which allows simultaneous optimization of underlying color halftone patterns. After the step of minimizing the halftone pattern $f_j$, a test to see if a halftone pattern has been generated for each color concentration level is typically done. If a halftone pattern has not been generated for each color concentration level, then the next halftone pattern $f_j$ is generated. If we have generated the halftone pattern for each color concentration level j, then a dither matrix is generated for each of the plurality of colors.

23 Claims, 12 Drawing Sheets

JOINT DESIGN OF DITHER MATRICES FOR A SET OF COLORANTS

BACKGROUND OF THE INVENTION

This invention relates generally to systems and methods for halftoning images and more particularly, to a digital color printer for generating calibrated dither matrices for use in creating color halftone images.

Digital halftoning refers to any process that creates the illusion of continuous tone images by judicious arrangement of the binary picture elements, such as ink drops in the case of inkjet printers. Thus, halftoning is printing the simulation of a continuous-tone image, such as a shaded drawing or photograph with groups or cells of color or black dots. The dots are placed in such a way that they appear to the human eye to be a single color.

There are many halftoning techniques, each with its own method for laying down dots. For example, frequency modulated halftoning uses the density of halftone dots to simulate grayscale. Examples of frequency modulated halftoning include pattern dithering and error diffusion. Pattern dithering uses a library or set of patterns to reproduce a color (in color printing) or a gray shade (in monochrome printing). Error diffusion uses complex algorithms to lay down dots of color in a random rather than a repeated pattern, to improve image quality.

Figure 1:
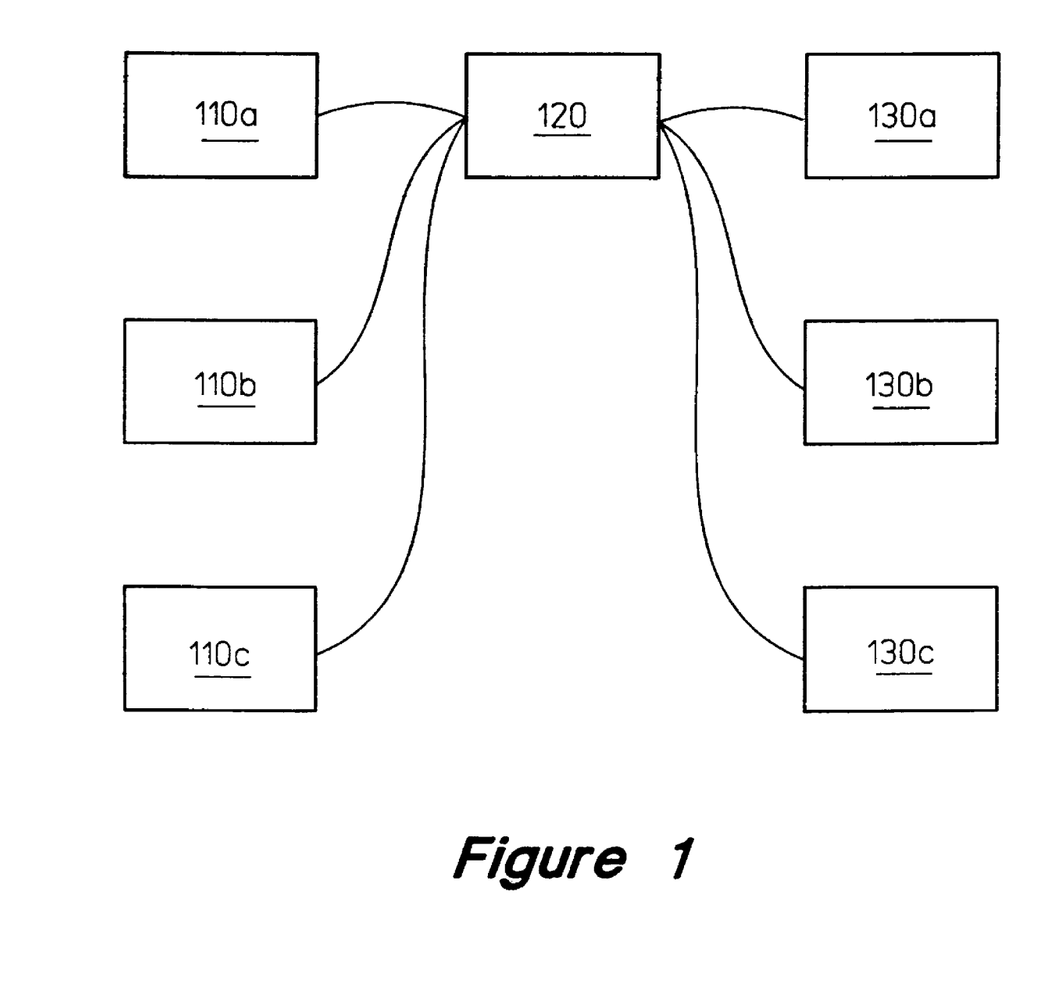
FIG. 1 shows a representation of a printing system used for generating a color print image.

Suppose a source color image is represented by the red, green, and blue components. The simplest way of halftoning a color image using a dither matrix is to halftone each color plane independently using the same dither matrix. FIG. 1 shows a representation of a printing system for generating a color print image. The image planes 110a, 110b, 110c are representative of the red, green and blue color components of an image. A single dither matrix, 120, is used to halftone each image independently, to create halftone images 130a, 130b, 130c. To create the halftone images, 130a, 130b, 130c, pixel values in the image planes 11a, 11b, 11c are compared to corresponding entries in the dither cell 120 to determine if they should be turned on or off. Halftoning is accomplished by a simple pointwise comparison of the source image 110 against a predetermined threshold array or mask. For every point or pixel in the source image, depending on which point value is larger, image or the mask, either a 1 or 0, respectively, is placed at the corresponding location in the binary output image.

Let the red, green and blue components of the source image 110 at pixel (m,n) be r(m,n), g(m,n), and b(m,n). If the dither matrix threshold value at the same position is t(m,n), then one of the most commonly used halftone rules is if r(m,n)<t(m,n), print a cyan dot at (m,n);

if g(m,n)<t(m,n), print a magenta dot at (m,n);

if b(m,n)<t(m,n), print a yellow dot at (m,n).

Let the maximum of r(m,n), g(m,n), and b(m,n) be x(m,n). If x(m,n)<t(m,n), then all cyan, magenta, and yellow dots will be printed. In a four-color printing device, a black dot is usually printed instead.

Whether the black dot is a CMY composite black dot or a true black dot, the resulting image using a dither matrix such as shown in FIG. 1, results in black dots occurring in highlight regions, which is not very visually pleasing. Various techniques have been used to try to improve the visual quality resulting from the use of a dither matrix. For example, U.S. Pat No. 5,341,228 to Parker et al. uses a dither matrix and deterministically shifts pixels for different color planes. In addition, there have been many attempts to disperse color dots to reduce color halftone texture. However, typically an unacceptable level of artifacts is created.

Instead of using the same dither matrix for all color planes, as shown in FIG. 1, a rotated clustered-dot matrix may be used for each color plane to simulate the effect of offset printing. Unfortunately, as a result of the interference between the color planes, rosette patterns are always present in the halftone image. Alternatively, instead of using a dither matrix, a much more complicated process is to search for the best halftone pattern for each individual image using a direct binary search algorithm. Halftone images generated using this algorithm have smooth texture in highlight regions. However, the computational cost has made it impractical in printing applications.

A technique for generating color dither matrices which provide improved image quality is needed.

SUMMARY OF THE INVENTION

The present invention provides a system and method for generating halftone patterns. Typically the generated halftone patterns are used for generating dither matrices to halftone a color image with improved visual quality The halftone patterns are preferably color halftone patterns having a plurality of colors and a predetermined number of color concentration levels. The term color concentration levels for color images is analogous to the term gray levels for black and white images. The steps for generating a plurality of color halftone patterns include: defining a color path from a color concentration level p to a color concentration level q; and generating halftone patterns $f_j$ for color concentration level j along the defined color path. Thus, the color path of the halftone patterns should range from a color concentration level p to a color concentration level q.

After the halftone pattern $f_j$ is generated for the color concentration level j, the color fluctuation of the halftone pattern $f_j$ is minimized. A key contribution of the present invention is the decomposition of a color halftone pattern which occurs during the step of minimizing the color fluctuation for halftone pattern $f_j$. Decomposition of the color halftone pattern allows simultaneous optimization of a number of underlying color halftone patterns. Color fluctuation is further minimized by limiting the list of permissible colors for each color concentration level. Limiting the list of permissible colors improves the smoothness of the halftone patterns.

After the step of minimizing the fluctuation of the halftone pattern $f_j$, a test is made to determine if a halftone pattern has been generated for each color concentration level. If a halftone pattern has not been generated for each color concentration level, then the next halftone pattern $f_j$ is generated. If we have generated the halftone pattern for each color concentration level j, then a dither matrix is generated for each of the plurality of primary color components.

The generated dither matrices output a halftone image that spatially distributes the cyan, magenta, and yellow dots in highlight regions, avoiding placement of cyan, magenta, and yellow dots at the same location or alternatively, the use of black dots. Spatial distribution of the cyan, magenta, and yellow dots reduces the halftone texture and improves the sharpness of the rendered halftone images. The advantages are two fold. First, the color dots are more dispersed and so will be less visible. The decreased visibility of the dots gives the impression to the human visual system that the print resolution increased. Second, dispersing the color dots means we have more dots to define an edge so that the color image appears sharper.

A further understanding of the nature and advantages of the invention described herein may be realized by reference to the remaining portion of the specification and the attached drawings.

DETAILED DESCRIPTION OF THE INVENTION

Figure 2A:
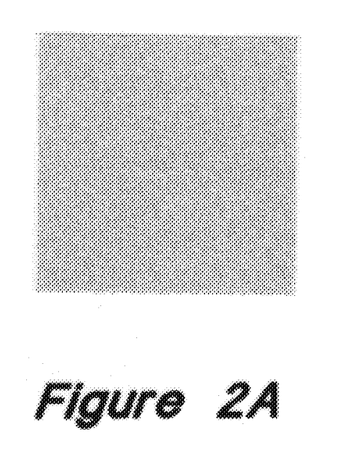
FIG. 2A is a print sample with a colorant value of 6.25% each of cyan, magenta and yellow dots with no black dots the same dither matrix for each color plane.
Figure 2B:
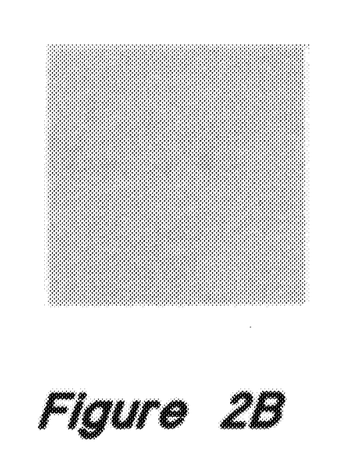
FIG. 2B is a print sample with a colorant value of 6.25% each of cyan, magenta, and yellow dots with no black dots using a dither matrix designed according to the present invention.

The present invention provides a system and method for generating halftone patterns. Typically the generated halftone patterns are used for generating calibrated dither matrices to halftone a color image with improved visual quality. For example, suppose that we want to print a light color concentration patch with 6.25% each of cyan, magenta and yellow dot on top of each other, then ignoring dot gain, 6.25% of the paper will be covered by ink. The covered area will either be cyan, magenta, or yellow dots, while the uncovered area will be white paper. Using the conventional pattern dithering technique shown in FIG. 1 results in the grainy pattern shown in FIG. 2A. Alternatively, according to the present invention, we disperse the cyan, magenta, and yellow dots. The covered area has either be cyan, or magenta, or yellow dots, while the uncovered area will be white paper. This reduces the contrast between covered and uncovered areas, resulting in a smoother pattern as shown in FIG. 2B.

To achieve a smoother pattern, our goal is to achieve a uniform rendition of any printable color using cyan, magenta, yellow and black printer dots. Our goal is achieved by selecting a color path that traverses the colorant space, and designing all halftone patterns along the path. This will ensure that not only the patterns we explicitly design, those along the white-black path in this example, are smooth and uniform, but also that the underlying patterns, those along the six colored paths, are smooth and uniform. One of the key contributions of this invention is to consider not only the patterns along the white-black path, but also its decompositions, in this case the patterns along the six colored paths. Referring to the color space in FIG. 3, the six colored paths are the white-cyan, white-magenta, white-yellow, white-red, white-green, and white-blue paths.

Figure 4:
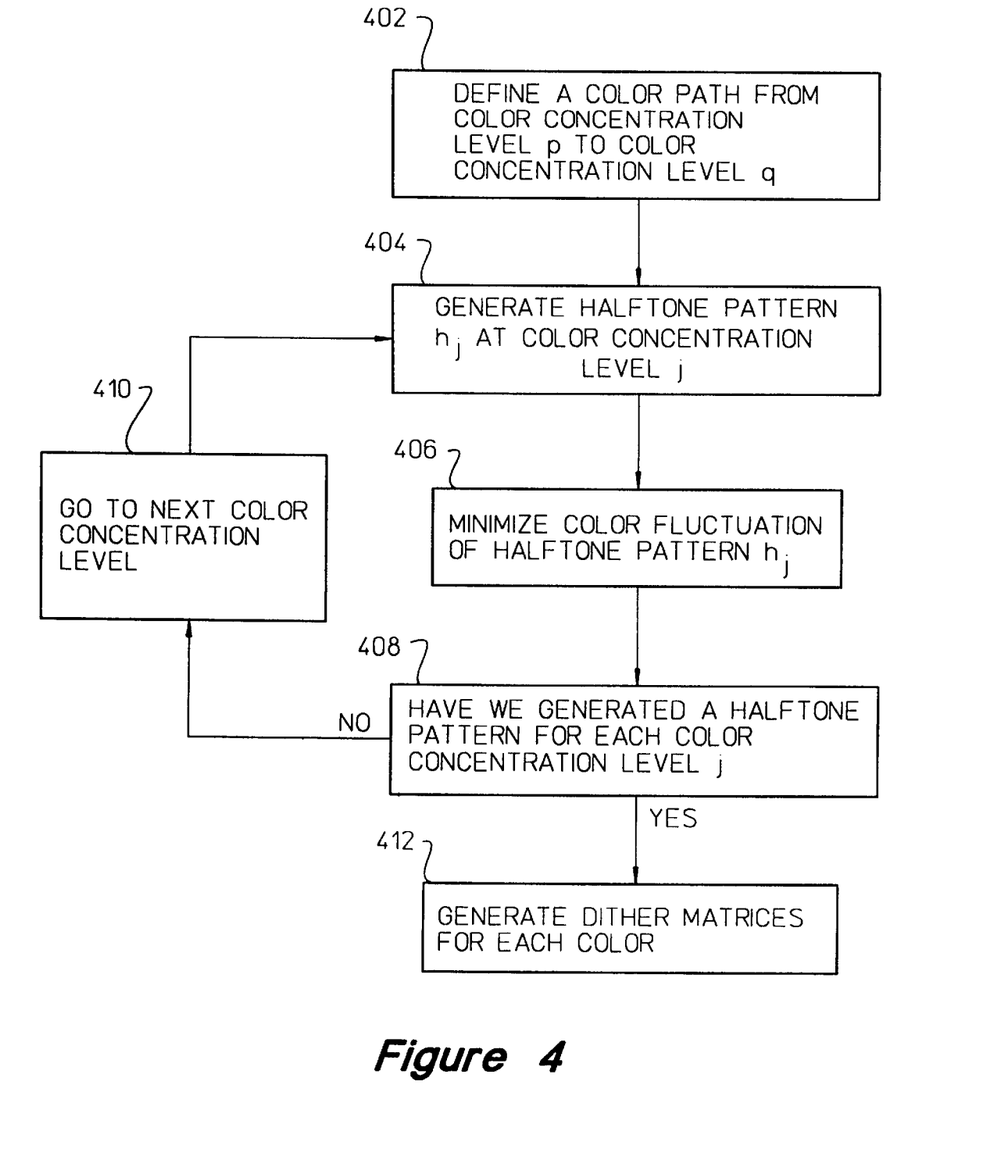
FIG. 4 is a flowchart showing the steps of generating a calibrated color dither matrix in accordance with the method of the preferred embodiment of the present invention.

The halftone patterns are preferably color halftone patterns having a plurality of colors and a predetermined number of color concentration levels. The term color concentration levels for a color image is analogous to the term gray level for a black and white image. The color concentration levels range from a color concentration level p to a color concentration level q. FIG. 4 shows a flowchart of the steps for generating calibrated color dither matrices in accordance with the present invention. The steps for generating color halftone patterns include: defining a color path from a color concentration level p to a color concentration level q (step 402); and generating halftone patterns $f_j$ for color concentration level j along the defined color path (step 404).

Figure 3:
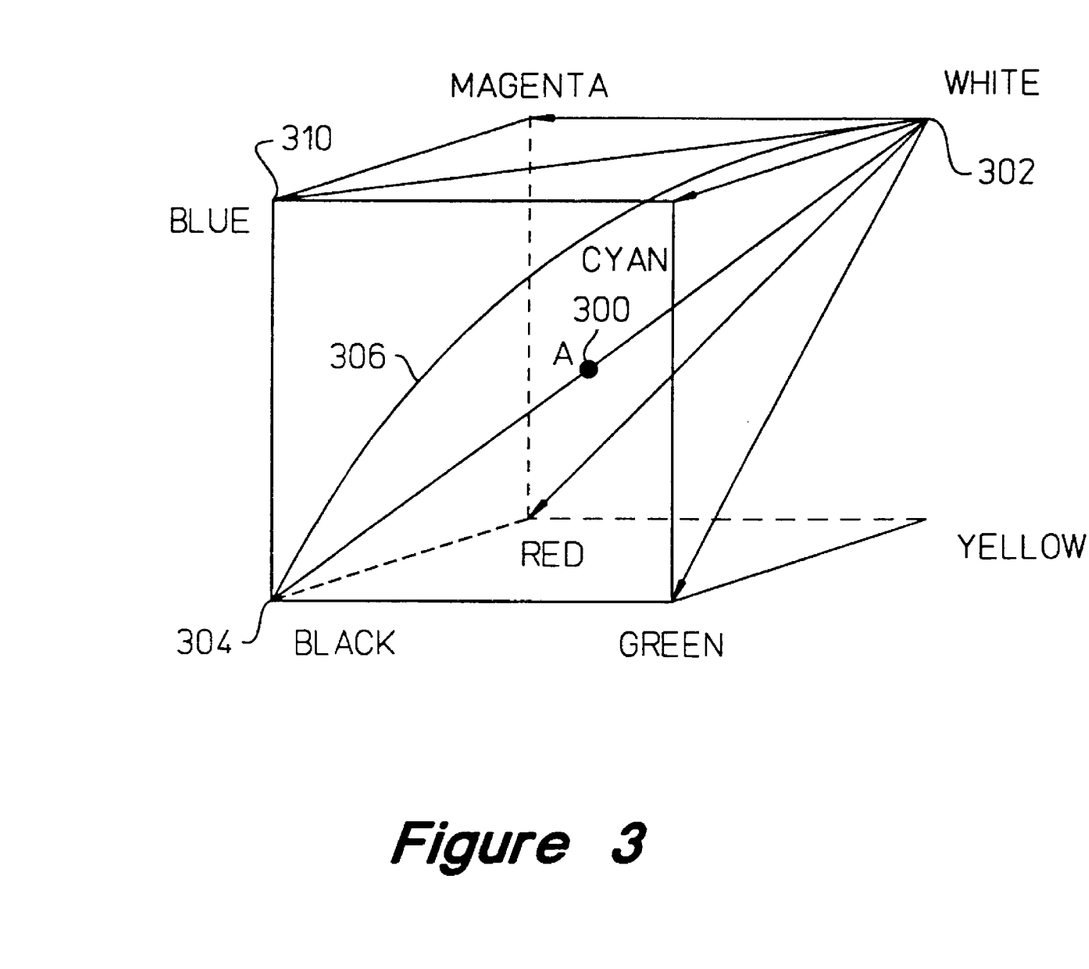
FIG. 3 shows the design path in the colorant space.

The first step in generating color halftone patterns is the definition of a color path. The color path is defined by the system designer. FIG. 3 shows a CMY color space and a color path 300 traveling from color concentration level p (point 302) to color concentration level q (point 304). Although, the color path may travel various routes from color concentration level p to q, for example along color path 300 or 306, preferably the color path is along path 300. Traveling along color path 300 results in equal amount of cyan, magenta and yellow pixels. Another alternative path is from point 302, to point 310 to point 304. Along this route equal amounts of cyan and magenta are added until point 304, at which point yellow pixels are added to the halftone pattern $f_j$.

After definition of the color path (step 402), a halftone pattern $f_j$ is generated for color concentration level j along the defined color path (step 404). The initial halftone pattern (the first halftone pattern) is preferably randomly generated. A specified number of cyan, magenta, and yellow dots is chosen by the designer. At each position, the pixel may take on any valid color. A random number generator assigns the color to a particular position in the initial pattern.

Figure 6:
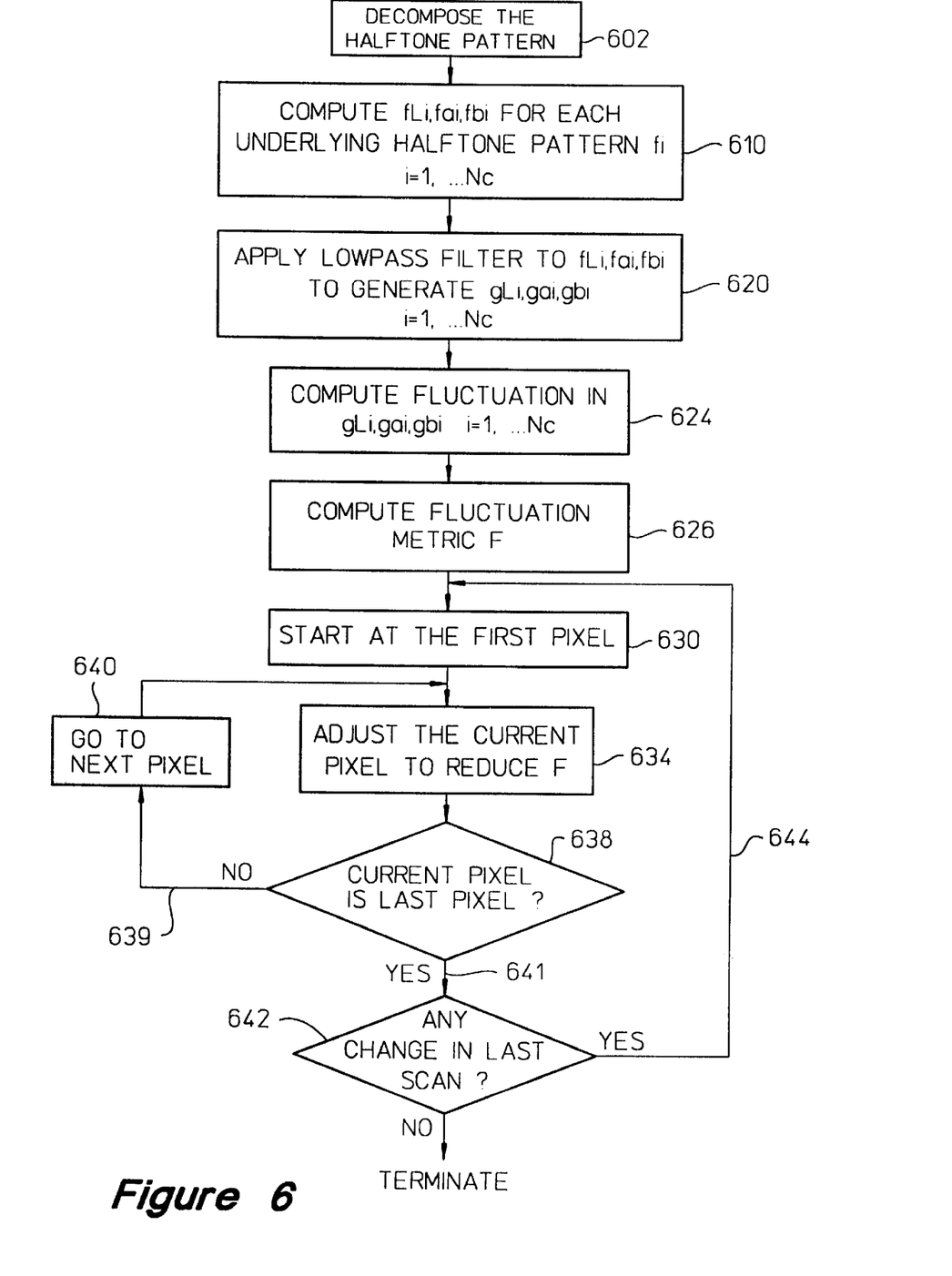
FIG. 6 is a flowchart showing the steps for refining the halftone pattern according to the present invention.

After the halftone pattern $f_j$ is generated for the color concentration level j (step 404), the color fluctuation of the halftone pattern $f_j$ is minimized for the pattern (step 406). FIG. 6 is a flowchart showing minimization of the color fluctuation. The process of minimizing the color fluctuation includes the steps of: computing a color fluctuation metric (steps 602–626), and the step of adjusting the color halftone pattern based on the fluctuation metric to minimize color fluctuation (steps 630–644). The step of computing a color fluctuation metric includes the steps of: decomposing the halftone pattern into its component parts 602, converting the decomposed color components into a uniform color space 610, and filtering the converted decomposed color components 620. After the decomposing, converting and filtering steps, the halftone pattern is adjusted (step 624) to minimize color fluctuation.

After generating the initial CMY random pattern, the halftone pattern is decomposed into its underlying component parts, step 602. Decomposing into underlying colors is not necessary if we only want to get one color halftone pattern uniform. However, since we are building dither matrices, we need to make sure that when we don't have one or two of the colors, the rest is still uniform.

Figure 7:
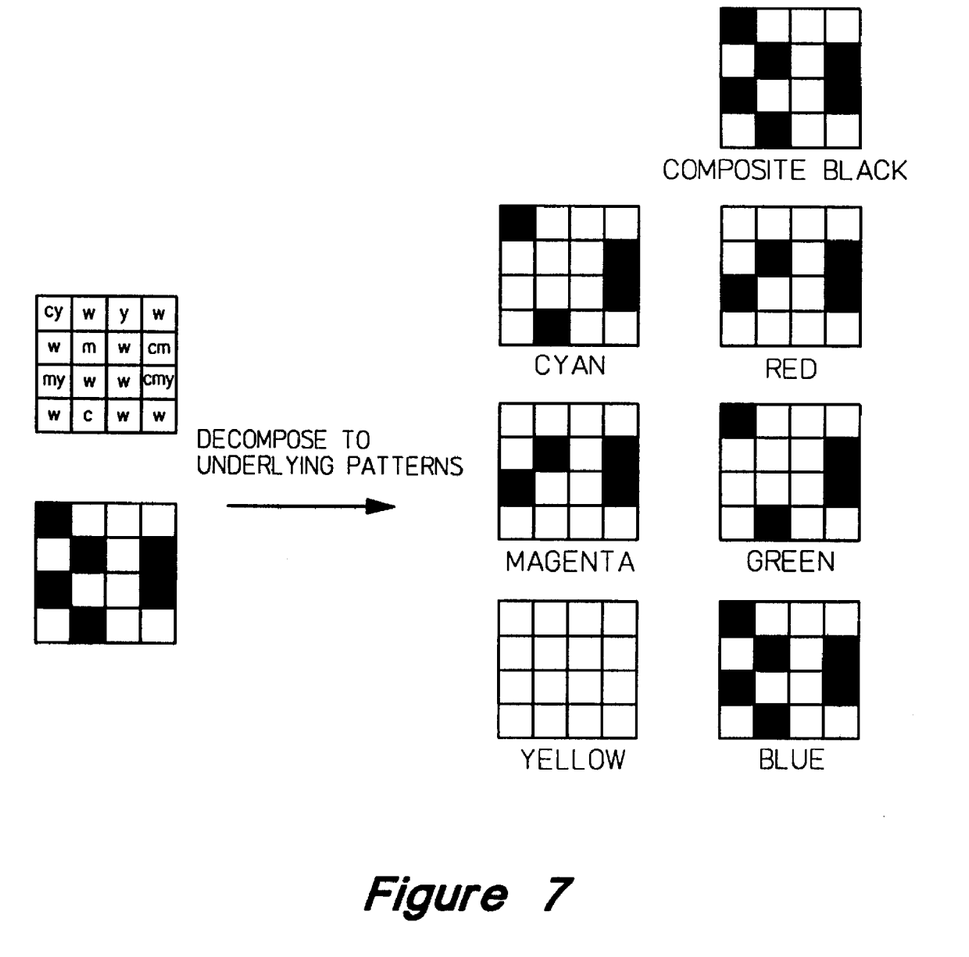
FIG. 7 is a representation of the decomposition of an initial pattern into underlying patterns.

The decomposition into underlying colors is illustrated in FIG. 7 for the simple case of 25% of cyan, magenta, and yellow each, with no black. In our dither matrices design of the present invention, we take all these patterns into account when computing the color pattern fluctuation metric. In generating the halftone patterns along the black-white axis of the colorant space, preferably the halftone patterns along at least a second color axis should be considered.

The process of color decomposition can be shown with the following example. Suppose we have only three colorants: cyan, magenta, and yellow with 25% cyan, 25% magenta, and 25% yellow. When we optimize this pattern, we need to consider its underlying pattern, for example, blue. When we remove the yellow dots, we get the blue pattern. Each pattern is then weighed according to some design criteria. For example, if we have 100% gray level component replacement, which means that we use real black, then composite black can be weighed less or not at all. In contrast, if we use 0% gray level component replacement, the composite black is very important.

Consider the binary printing case, where a valid color is composed of at most one dot of each color. For CMYK printing, without maximum amount of ink restrictions, there are sixteen valid colors: c(cyan), m(magenta), y(yellow), k (black), w(white), cm(blue), cy(green), my(red), ck, mk, yk, cmy, cmk, cyk, myk, and cmyk. For convenience, we can use c(m,n) to represent the color of the pixel at position (m,n). Suppose the dither matrices we are designing are M×N, then $0 \leq m < M$, and $0 \leq n < N$. In this case, c(m,n) is a four-bit number with each bit from left to right corresponding to cyan, magenta, yellow and black respectively. When one of the primary colors is present at (m,n), the corresponding bit in c(m,n) is set to 1. Otherwise, it is set to 0. For example, if the color of the pixel is cm(blue), then c(m,n) =1100.

Refer to FIG. 7 for a representation of the decomposition of an initial pattern into its underlying color components. The i-th decomposition halftone pattern can be represented by $f_{ij}$ (m,n) for a pattern having color concentration level j. Let the maximum number of underlying colors in the decomposition be $N_c$. Thus, for a CMYK pattern, $N_c$ is sixteen. The i-th decomposition $f_{ij}$(m,n) is the result of the AND operation of $c_j$(m,n) with i-th color:

$$f_{ij}(m,n)=c_j(m,n)\&i$$

For example, the 4-th decomposition is $f_{ij}$(m,n)=$c_j$(m,n) & 0100. So when there is magenta dot at (m,n) in the i-th decomposition pattern, then $f_{ij}$(m,n)=0100. Otherwise, $f_{ij}$(m, n)=0000. Step 602, involves the process of decomposing the color $c_j$(m,n) into its underlying component parts $f_{ij}$(m,n). As a second example, the 6-th decomposition is $f_{ij}$(m,n)=$c_j$(m, n) &0110. This corresponds to the secondary color red, which is seen by the viewer whenever a magenta dot and a yellow dot are printed out at the same pixel location or whenever a magenta dot and a yellow dot are printed at two different pixel locations which are in close proximity.

After decomposing the initial halftone pattern into its component parts 602, the decomposed color components are converted into a uniform color space representation 610. A uniform color space better represents how the human visual system responds to color. We first convert the color patterns from the colorant space (CMYK space) into a uniform color space. Although preferably the color patterns are converted into a L*a*b* space, other uniform color spaces may be used. The conversion is achieved by measuring the L*a*b values of all sixteen valid colors previously listed. Symbolically, we can use $fL_{ij}$(m,n), $fa_{ij}$(m,n), and $fb_{ij}$(m,n) to represent the L*a*b* values of $f_{ij}$(m,n).

After the step of converting the decomposed color components into a uniform color space 610, we then apply a lowpass filter to the L*a*b* pixel maps, step 620. The lowpass filter models the frequency response of the human visual system. Since the human visual response is more sensitive to the luminance information, the bandwidth of the filter corresponding to the luminance is larger than the bandwidth of the filter corresponding to the chroma. In addition, the luminance filter has a 45 degree roll-off.

Figure 8:
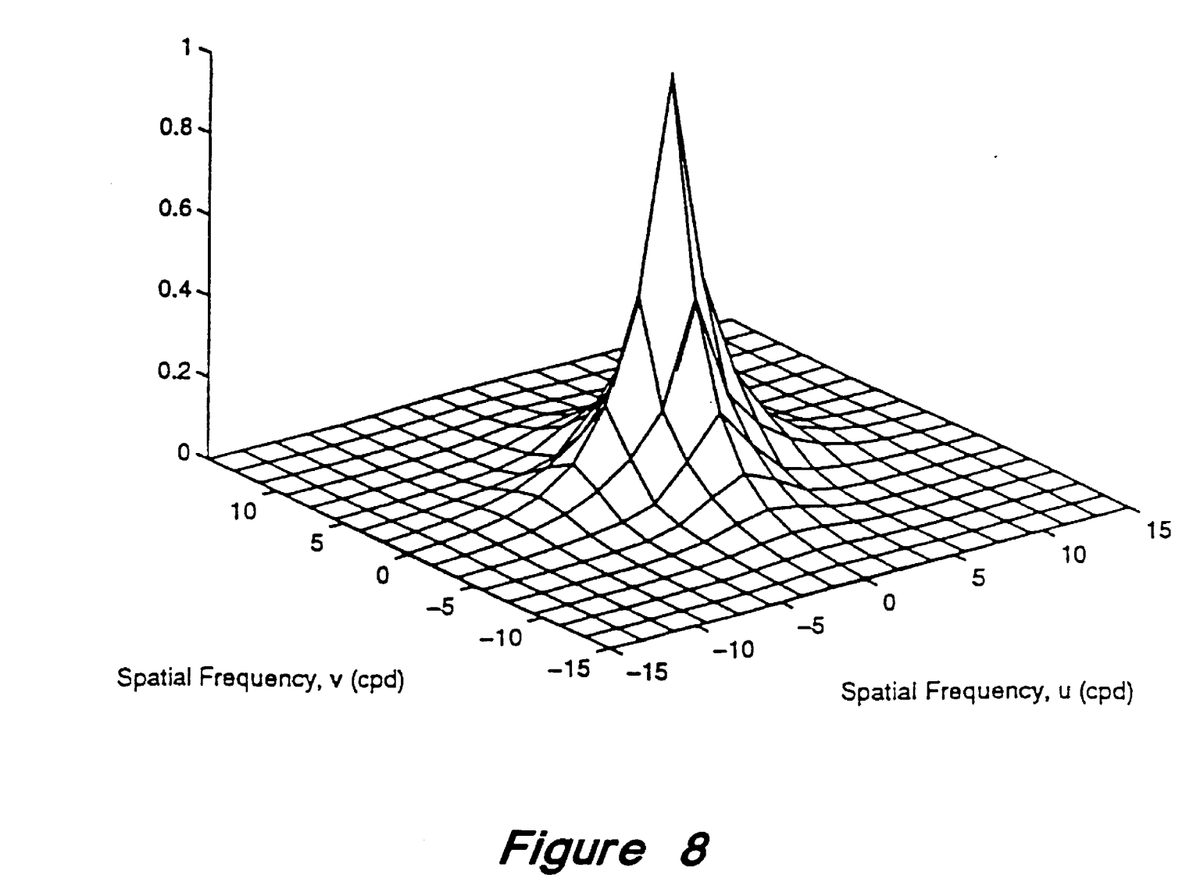
FIG. 8 is a graphical representation of the frequency response of the function hL(m,n).
Figure 9:
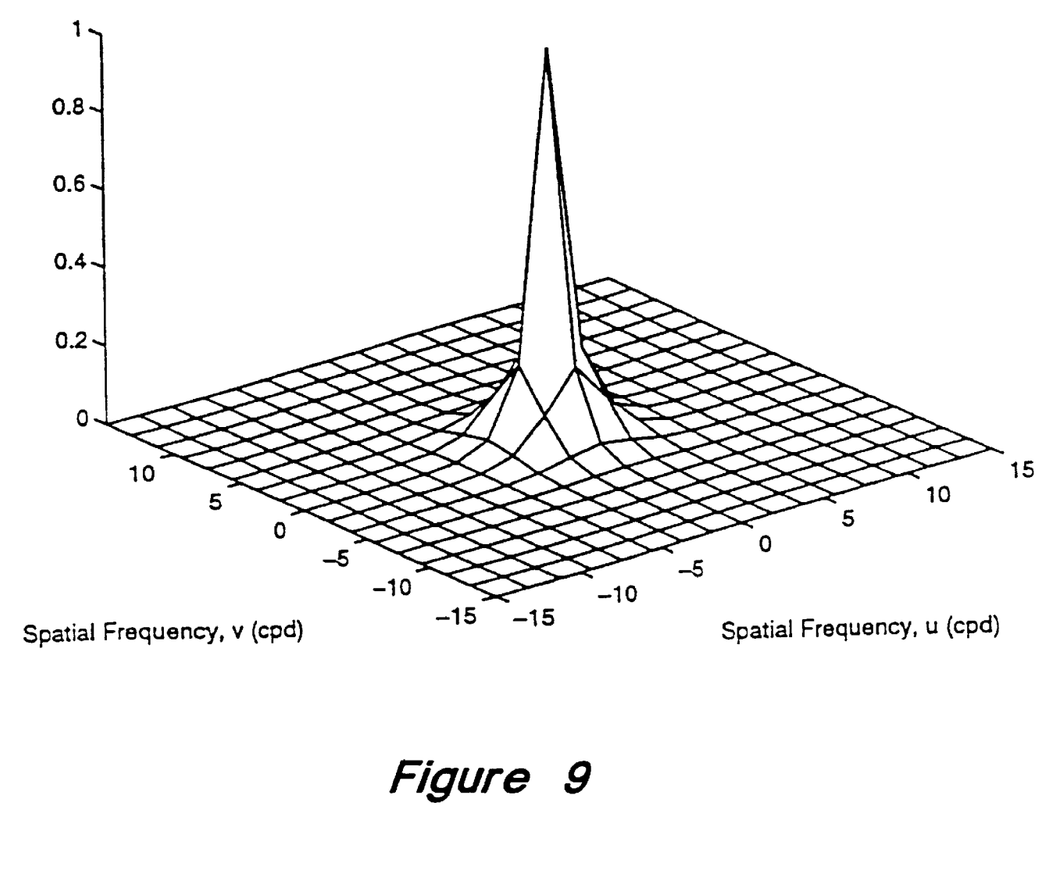
FIG. 9 is a graphical representation of the frequency response of the function hc(m,n).

Let Hl(u,v) and Hc(u,v) represent lowpass filters corresponding to the luminance and chroma respectively. Their frequency responses are plotted in FIGS. 8 and 9. FIG. 8 is a graphical representation of Hl(u,v). FIG. 9 is a graphical representation of Hc(u,v). The digital lowpass filters we apply to the binary pattern are samplings of the luminance filter and the chroma filter. Let HL(m,n) and HC(m,n) represent the digital lowpass filters. Then $$HL(m,n)=Hl(km,kn)$$

$$HC(m,n)=Hc(km,kn)$$

where k is a constant determined experimentally, which varies with color concentration level. It is smaller for midtone, and larger for highlight and shadow tones. In the spatial domain, the digital filters hL(m,n) and hC(m,n) are the Inverse discrete Fourier transforms of the HL(m,n) and HC(m,n).

Figure 10:
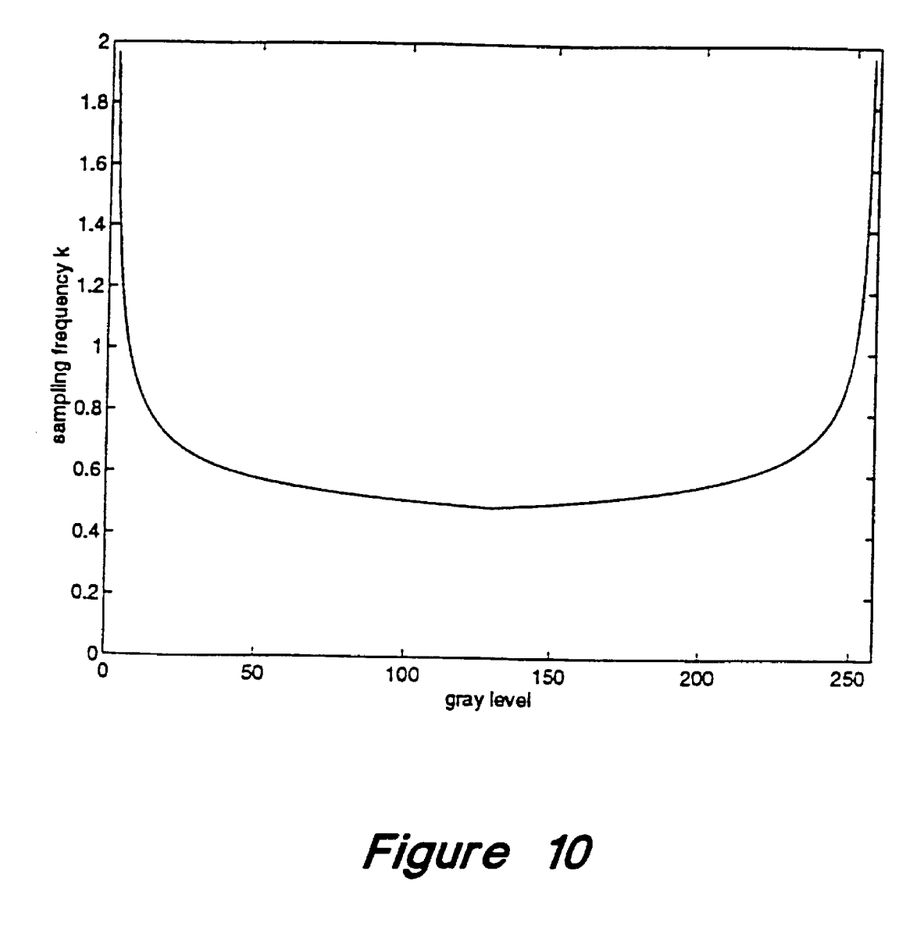
FIG. 10 is a graphical representation of the selection of the sampling frequency k as a function of color concentration level.

FIG. 10 shows an example of k as a function of color concentration level. The purpose of varying k with color concentration level is to adjust the spread of luminance and chroma filters according to the average pixel spacing of the pattern we are designing. This adjustment will ensure that the uniformity is achieved for all color concentration scales.

Although other methods may be used, preferably color fluctuation in the present invention is minimized using a modified direct binary search algorithm that is adapted for dither matrix design. One of the drawbacks of the direct binary search (DBS) algorithm is that it has problems in the highlight and shadow areas. One solution is to switch to a pixel density modulation (PDM) algorithm. In the preferred embodiment of the present invention, we use the method described in U.S. Pat. No. 5,317,418, which adjusts the HVS response according to the color concentration level to provide super smooth dither. This adaption may be integrated into a DBS algorithm. Further, an additional advantage of the U.S. Pat. No. 5,317,418, compared to the aforementioned PDM is elimination of the transition problem which occurs when switching from DBS to PDM.

The result of the filtering is $$gL_i(m,n)=fL_i(m,n)**hL(m,n)$$

$$ga_i(m,n)=fa_i(m,n)**hc(m,n)$$

$$gb_i(m,n)=fb_i(m,n)**hc(m,n)$$

I=1, . . . $N_c$

The variances of the resulting L*a*b*k pixel maps are computed, which represents the amount of fluctuation in each underlying pattern. Let the variances be represented by $\sigma_{gL_i}^2$, $\sigma_{ga_i}^2$, and $\sigma_{gb_i}^2$. Then the color fluctuation in the I-th decomposition pattern can be computed according to $$\sigma_{g_i}^2=\alpha\sigma_{gL_i}^2+\sigma_{ga_i}^2+\sigma_{gb_i}^2$$

where α is the weighting factor that emphasizes the importance of luminance in human perception. In the preferred embodiment, α is chosen to be four.

Using the computed variances, the color fluctuation metric is computed, step 626, using the weighted sum of the variances.

$$F = \sum_{i=0}^{N_c-1} w_i \sigma_{gi}^2$$

$w_i$ is the weighting factor of the i-th color. It ranges between 0 and 1. Usually, a larger weighting factor is chosen for a more important color or a color that is more difficult to control. One example is to choose $w_i$ to be 1 for the secondary colors (red, blue, and green) and composite black (CMY) and to choose $w_i$ to be 0 for the rest of the colors.

After computation of the fluctuation metric, the color fluctuation is minimized. In the present embodiment of the present invention, the step of minimizing the color fluctuation by adjusting the current pixel typically includes the step of either swapping or toggling, to reduce the fluctuation metric, step 634. Preferably, during the initial pass, the first pixel is set equal to the current pixel. The current pixel position then moves from the first pixel position in the array to the last pixel position in the array. Referring to FIG. 6, starting at the first pixel, after the current pixel is swapped or toggled, the current pixel is checked to see if it is the last pixel in the halftone pattern, step 638. If the current pixel is not the last pixel in the halftone pattern (branch 639), then the program goes to the next pixel, step 640 and starts to repeat step 634. If the current pixel is the last pixel, branch 641, then the halftone pattern is checked to see if there was an adjustment in the last scan, step 642. If there has been a change, branch 644, then the program starts again at the first pixel 630. If there has been no change in the halftone pattern in the last scan, the program returns.

To minimize the fluctuation metric, we scan through the pixel map, one pixel at a time. At each pixel, the current pixel is adjusted to reduce the fluctuation metric and a new fluctuation metric is computed. This process is illustrated in detail in FIG. 11. The toggle operation at a pixel refers to switching from the existing color to any other valid color. The swap operation refers to exchanging one primary color or white at the current pixel with another primary color or white at another pixel in the array which is within a specified neighborhood of the current pixel. Whether we can do swapping depends on three conditions: (1) we should get a valid color after swapping, (2) we do not violate the stacking property of the dither matrix, and (3) the resulting color must be on the permissible color list. The colors at both pixels after swapping must still be one of the valid colors. By this we mean the swap cannot result in two dots of the same primary color; cyan, magenta, yellow or black, being placed at the same pixel location. In addition, it must also be a permissible color at the color concentration level of the halftone pattern.

For example, for color concentration levels between 0 and 33%, we only allow primary colors and white at each pixel location. No secondary or tertiary colors are allowed. This means that a maximum of one layer of ink will be printed on the paper. The list of permissible colors at each color concentration level thus puts additional constraints on the search algorithm, so that the smoothness of the pattern will be improved.

The permissible color list is dependent on the color concentration. For example, in designing CMY matrices with composite black, we only allow dots of primary color and white in the first one third of the ramp, and dots of primary color and secondary color in the next third of the ramp. This will further ensure that the color dots are dispersed as widely as possible.

We select the operation (either swapping or toggling) that results in the largest reduction in the fluctuation metric, and keep the new pattern generated by this operation. If both the swap operation and the toggle operation result in an increase in the fluctuation metric, then we restore the previous pattern. The process is continued until no operation is retained after a complete scan of the pixel map.

Although the current pixel may be adjusted by either swapping or toggling, in the preferred embodiment of the present invention, the current pixel is adjusted by swapping. The toggling operation will change the dot percentage and make tone drift, thus in the preferred embodiment, the toggling operation is disabled. Using the swap operation only, we increased the swap search neighborhood to 128× 128 which is the whole matrix and used an adaptive filter width to make the pattern uniform. Using the swap and toggle operation, we used an 8 pixel neighborhood.

Figure 11:
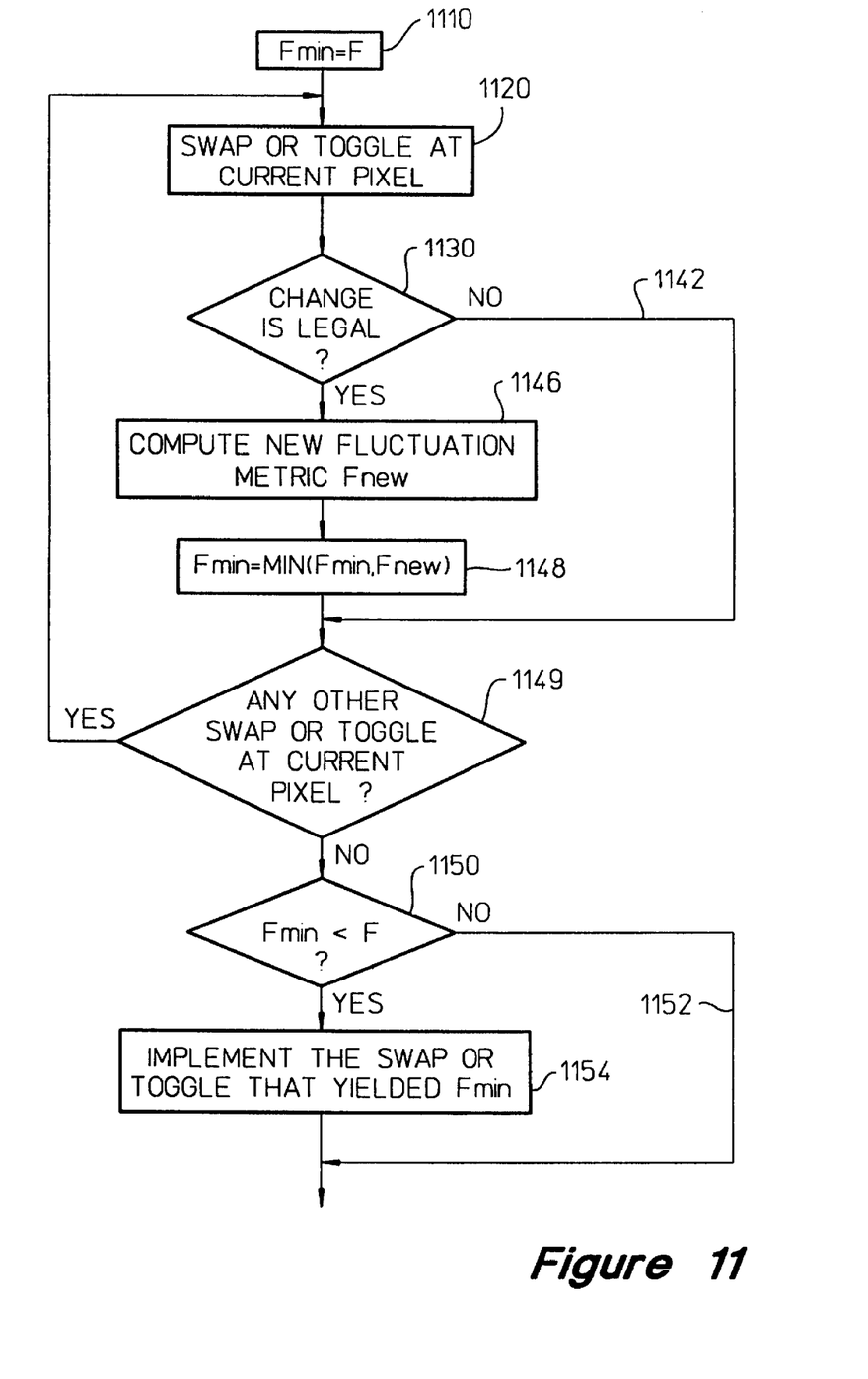
FIG. 11 is a flowchart showing how the current pixel is adjusted to minimize the fluctuation metric according one embodiment of the present invention.

FIG. 6, step 634 is the step of adjusting the current pixel to reduce the fluctuation metric. FIG. 11 shows in expanded detailed the step of adjusting the current pixel to reduce the fluctuation metric. Referring to FIG. 11, in the preferred embodiment the step of adjusting the current pixel to reduce the fluctuation metric includes the steps of setting the minimum fluctuation metric equal to the current fluctuation metric 1110, adjusting (by swapping or toggling) the current pixel 1120, checking to see if the adjustment to the pixel (by swapping or toggling) is legal 1130, computing a new fluctuation metric 1146, and assigning a new minimum fluctuation metric after checking the pixel array 1148.

Referring to FIG. 11, the first step in adjusting the current pixel to reduce the fluctuation metric is the setting $F_{min}$ equal to F, step 1110, where $F_{min}$ is the minimum fluctuation metric and F is the current fluctuation metric. Next the current pixel is either swapped or toggled, step 1120. In the preferred embodiment the current pixel is adjusted by swapping. After the current pixel is swapped, step 1120, the current pixel is checked to see if the change (the swap) is legal, step 1130. When checking the initial halftone pattern, a legal change occurs if the current pixel is within the permissible color list. For a halftone pattern other than first halftone pattern generated, a legal change occurs if the current pixel is within the permissible color list and if the current pixel is either a newly added or newly deleted dot. If the pixel is a newly added or newly deleted dot, the change is legal and it can be moved. If the change is not legal, then the halftone pattern is checked to see if there is any other swap or toggle at the current pixel, step 1149.

If the change is legal, branch 1142, then a new fluctuation metric $F_{new}$ is computed, step 1146. After the new fluctuation metric is computed, step 1148, the current halftone pattern is checked to see if there is any other swap or toggle at the current pixel, step 1149. If there is any other swap or toggle at the current pixel, branch 1150, then the program continues to swap or toggle the current pixel at step 1120.

If there is no other swap or toggle for the current pixel in the halftone pattern, then the fluctuation metric is checked, step 1150, to see if it is less than the minimum fluctuation metric $F_{min}$ computed in step 1148. If the fluctuation metric is not less than $F_{min}$, branch 1152 then the program continues to step 404 and generates a new halftone pattern for the next color concentration level. If the fluctuation metric is less than $F_{min}$, then the swap or toggle that yielded $F_{min}$ is implemented, step 1154.

Figure 5:
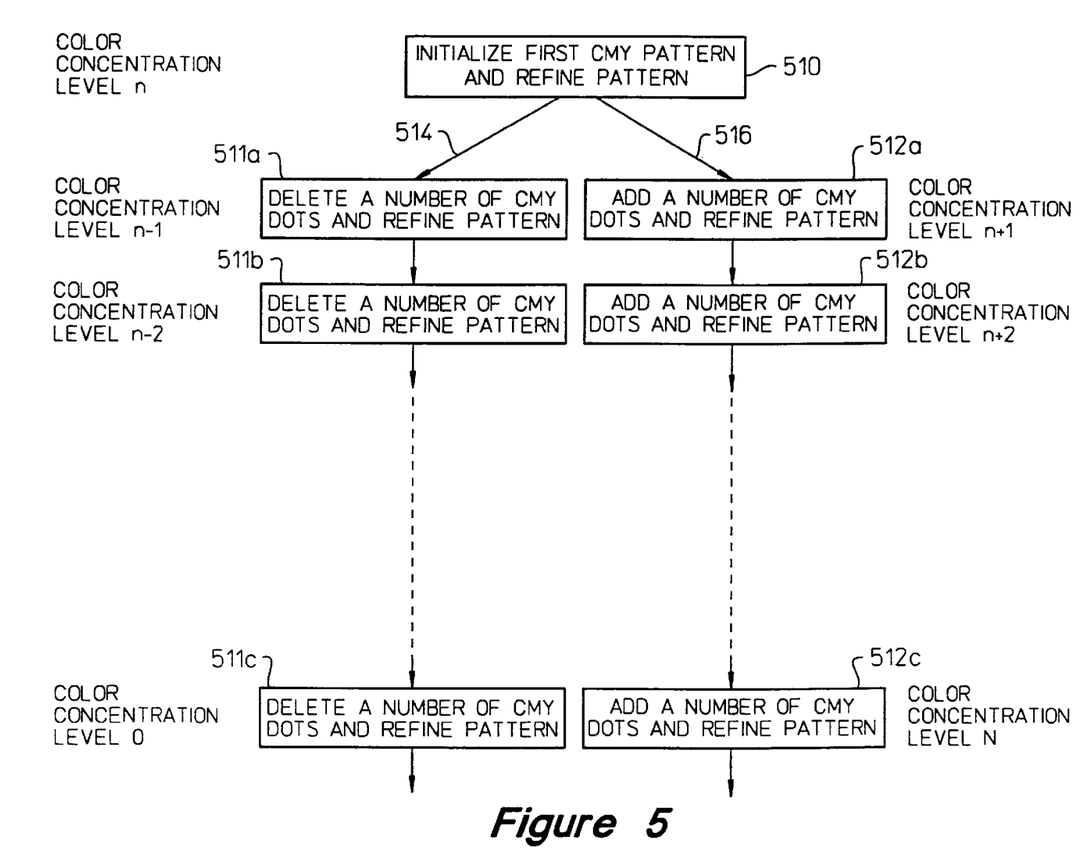
FIG. 5 is a flowchart showing the steps for generating the halftone patterns for color concentration levels 0 to N in accordance with the present invention.

The first halftone CMYK pattern we design will also influence all underlying patterns, i.e. patterns of a primary color (either cyan, or magenta, or yellow, or black), and secondary color (any combination of two colors from cyan, magenta, yellow, and black). The decomposition into underlying colors is illustrated in FIG. 7. FIG. 5 shows the method for generating the halftone patterns for color concentration levels 0 to n in accordance with the present invention. In the example shown in FIG. 5, N is equal to 255.

Referring to FIG. 5, we first design a first CMYK pattern for level n (510), which for example is located at point A on the white-black path in FIG. 3. We then design all the lighter patterns by gradually removing dots (step 510), moving from point A to white along the black-white path in our example. We next design all the darker patterns, by gradually adding dots (512), moving from point A to black along the black-white path in our example. This will ensure that the stacking property of the dither matrix is satisfied, i.e. all dots in a lighter pattern must also be present in a darker pattern.

Referring to FIGS. 4 and 5, after generating the first halftone pattern, the color fluctuation for each color in the halftone pattern is refined. Refining the halftone pattern includes the step of minimizing the color fluctuation of each halftone pattern, step 406. The first halftone pattern is typically a randomly generated pattern. After generation of the first halftone pattern, the color fluctuation of the first halftone pattern is minimized. For halftone patterns after the initial halftone pattern, dependent on whether the next color concentration level is lighter or darker, we randomly delete dots (step 511) or add dots (step 512). After the dots are either deleted or added, the pattern is refined in part by minimizing the color fluctuation. This process is repeated until halftone patterns at all color concentration levels are generated.

FIG. 5 is a flowchart showing the steps for generating the halftone patterns for color concentration levels 0 to 255 in accordance with the method of the present invention. Referring to FIG. 5, after the step of generating and refining the first or initial halftone pattern, halftone patterns for all the color concentration levels are generated. After the halftone pattern is generated, typically a check is performed (step 408) to see if a halftone pattern has been generated for each color concentration level. If not, a halftone pattern for the next color concentration level is generated.

If the initial halftone pattern is darker than the halftone pattern represented by branch 514, then a predetermined number of CMY dots are deleted from the halftone pattern. The number of CMY dots that are deleted depends on its color concentration scale level. For example, the halftone pattern at level 511a deletes more cmy dots than the halftone pattern at level 511b. Similarly, if the initial halftone pattern is lighter than the halftone pattern represented by branch 514, then a predetermined number of cmy dots are added to the halftone pattern. The number of CMY dots that are added depends on the color concentration scale level. For example, more CMY dots are added to the halftone pattern at level 512a than at level 512b. In the preferred embodiment, the initial pattern is designed to be the lightest halftone pattern so that dots are only added in generating halftone patterns at different color concentration levels. Alternatively, the initial pattern could be designed to be the darkest halftone pattern so that dots are only deleted in generating halftone patterns at different color concentration levels.

The number of CMYK dots for each concentration level can be obtained with a calibration procedure as described in patent application having Serial Number. 08/308,321, filed Sep. 19, 1994, entitled "System and Method for Generating Calibrated Dither Matrices."

After the halftone pattern is generated for a specific color concentration level, the halftone pattern is refined, according to the steps in FIG. 6. FIG. 6 showing the steps for refining the halftone pattern according to the present invention. Thus, the halftone pattern for each color concentration level must go through the steps in FIG. 6 to minimize the color fluctuation of that halftone pattern.

Once we have designed the halftone patterns for all of the color concentration levels, we can generate the dither matrices for each color plane, step 414. The final dither matrices for each primary color can be obtained by summing the binary patterns of the primary color for all color concentration levels. In one example, one set of matrices we generated is as follows: the CMY matrices are generated together by controlling CM,CY,MY and CMY and K matrix. Even though we do not control the primary colors CMY directly, the primary ramps are still quite good with the indirect control.

Halftoning uses a set of matrices jointly designed for different color planes. In contrast to the printing system shown in FIG. 1 which has a single dither matrix for the three different image planes 110a, 110b, and 110c, in the present implementation shown in FIG. 12, separate dither matrices 1210a, 1210b, 1210c exist for each image plane 1220a, 1220b, 1220c.

Figure 12:
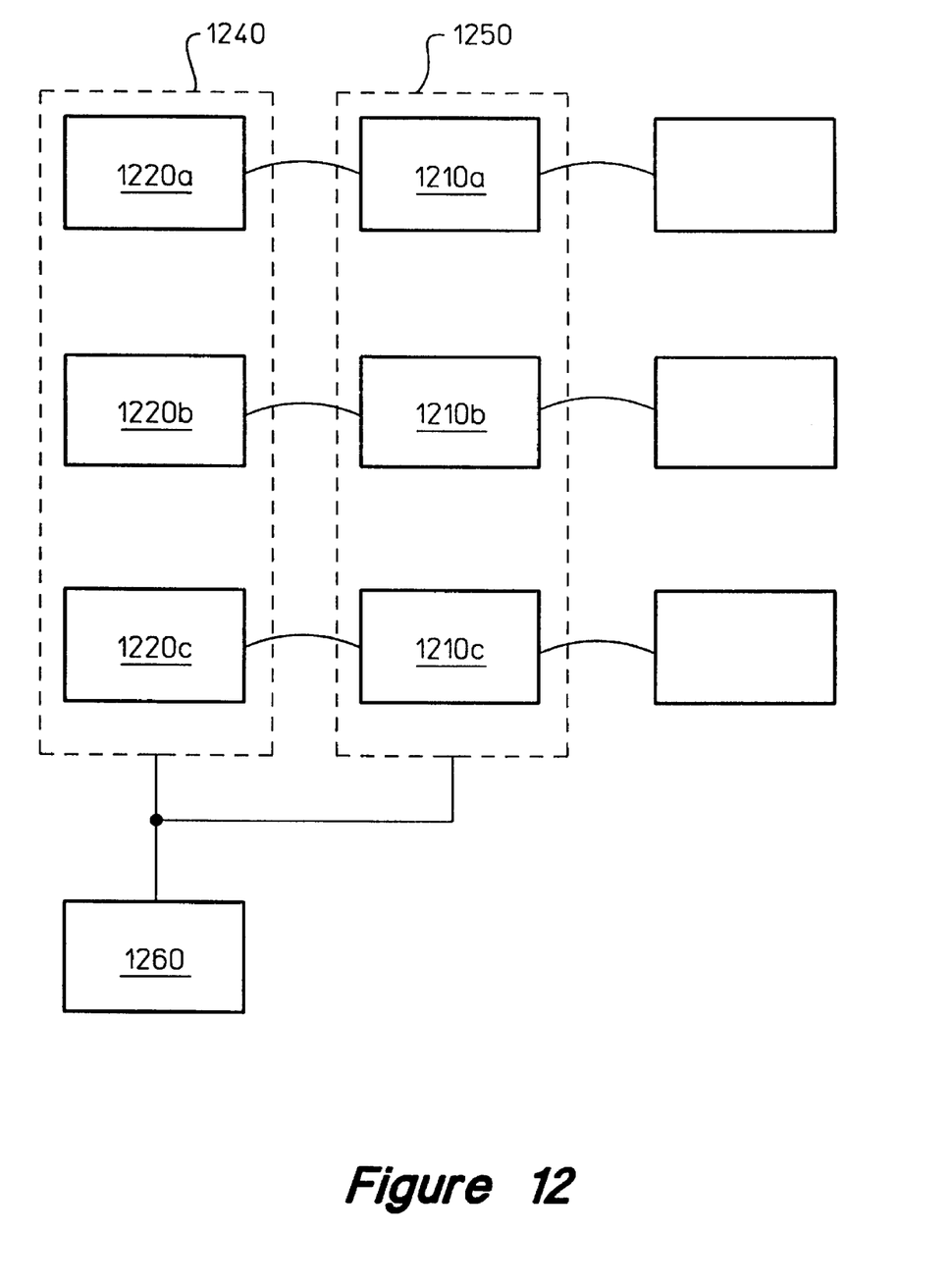
FIG. 12 shows a representation of a printing system used for generating a color print image.

Using the same notation as before, the new halftoning rule is if $r(m,n) < tc(m,n)$, print a cyan dot at $(m,n)$;

if $g(m,n) < tm(m,n)$, print a magenta dot at $(m,n)$;

if $b(m,n) < ty(m,n)$, print a yellow dot at $(m,n)$ where tc,tm and ty are jointly designed dither matrices for cyan, magenta and yellow planes. If $tc(m,n)$ $tm(m,n)$ $ty(m,n)$ for all I and j, then the new halftoning rule is the same as the old one. The dither matrices tc(m,n), tm(m,n), ty(m,n) can be downloaded to a postscript file, and used to render an image in a postscript printer.

If the printer is a four color printer, then one way the algorithm can be used is with the following modification: if all cyan, magenta, and yellow dots are to be printed at (m,n), then print a black dot at (m,n) only. However, if a more sophisticated color separation system is used to covert the red, green and blue color components to cyan, magenta, yellow and black colorants, then we can halftone according to if $c(m,n) < tc(m,n)$, print a cyan dot at $(m,n)$;

if $m(m,n) < tm(m,n)$, print a magenta dot at $(m,n)$;

if $y(m,n) < ty(m,n)$, print a yellow dot at $(m,n)$ if $k(m,n) < tk(m,n)$, print a black dot at $(m,n)$.

The color image halftoning scheme described in this invention reduces the halftone texture and increases the sharpness of the halftone image. In addition, the computational complexity remains the same as in conventional methods.

The system used to generate a color halftone image from a color continuous tone image using the color dither matrices that have been designed includes: a first memory means 1240 for storing color components for each pixel in the color image; a second memory means 1250 for storing parameters of a plurality of dither matrices 1210, a dither matrix corresponding to each of said color components, wherein the color fluctuation in each of the dither matrices is minimized; and a processor means 1260 coupled to the first memory means for comparing the dither matrices with each color components, wherein responsive to the comparison a color component is selected for printing. The first or second memory means for storing the color components, the dither matrices, or the software used by the processor means may be stored on any storage medium readable by a computer.

It is understood that the above description is intended to be illustrative and not restrictive. For example, during minimization of the fluctuation metric, the current pixel may be adjusted by swapping or toggling and examples referring to a swapping step may be replaced with a toggling step, or vice versa. Further, although FIG. 3 shows a three dimensional CMY color space, other color spaces, may be used. For example, the present invention can be applied to a four dimensional CMYK color space. In addition, although preferably the color pattern has a plurality of colors, the present invention can be used to generate a dither matrix for a single color. The scope of the invention should be determined with reference to the appended claims, along with the full scope of equivalents to which such claims are entitled.

What is claimed is:

1. A method of generating stochastic color halftone patterns, the color halftone patterns ranging from a color concentration level p to a color concentration level q, the method including the steps of:

defining a color path, wherein the defined color path is selected from a plurality of available color paths from concentration level p to color concentration level q;

generating halftone patterns $f_j$ for color concentration level j along the defined color path; and minimizing the color fluctuation of the halftone pattern $f_j$.

2. The method recited in claim 1 wherein the defined color path is along the black-white axis of the color space, and further wherein the color fluctuation is minimized for the halftone patterns $f_j$ along both the primary color axis and the secondary color axis of the color space.

3. The method recited in claim 1, further including the step of testing whether a halftone pattern has been generated for each color concentration level.

4. The method recited in claim 3, wherein if a halftone pattern has not been generated for the next color concentration level, the halftone pattern for the next color concentration level is generated along the defined color path.

5. The method recited in claim 4 wherein if a halftone pattern has been generated for each color concentration level, dither matrices are generated for each of the plurality of colors.

6. A method of generating color halftone patterns, the color halftone patterns ranging from a color concentration level p to a color concentration level q, the method including the steps of:

defining a color path from color concentration level p to color concentration level q;

generating halftone patterns $f_j$ for color concentration level j along the defined color path;

minimizing the color fluctuation of the halftone pattern $f_j$; and testing whether a halftone pattern has been generated for each color concentration level.

7. The method recited in claim 6, wherein if a halftone pattern has not been generated for each color concentration level, the color concentration level j is adjusted and the next halftone pattern $f_j$ is generated along the defined color path.

8. The method recited in claim 7 wherein if a halftone pattern has been generated for each color concentration level, dither matrices are generated for each of the plurality of colors.

9. A method of generating color halftone patterns, the color halftone patterns ranging from a color concentration level p to a color concentration level q, the method including the steps of:

defining a color path from color concentration level p to color concentration level q;

generating halftone patterns $f_j$ for color concentration level j along the defined color path; and minimizing the color fluctuation of the halftone pattern $f_j$, wherein color fluctuation is minimized using a modified direct binary search algorithm adapted for dither matrix design.

10. The method recited in claim 9 wherein the direct binary search algorithm is modified by adjusting the HVS response according to the color concentration level to provide super smooth dither.

11. The method recited in claim 10 wherein the permissible colors in the first one third of the ramp are primary color pixels and white, and wherein the permissible colors in the second one third of the ramp are pixels of the primary colors and pixels of the secondary color.

12. A method of generating color halftone patterns, the color halftone patterns ranging from a color concentration level p to a color concentration level q, the method including the steps of:

defining a color path from color concentration level p to color concentration level q;

generating halftone patterns $f_j$ for color concentration level j along the defined color path;

minimizing the color fluctuation of the halftone pattern $f_j$, wherein the step of minimizing the color fluctuation for each color concentration level j includes the steps of computing a new color fluctuation metric, and adjusting the halftone pattern $f_j$ based on the new color fluctuation metric in order to minimize color fluctuation.

13. The method recited in claim 12 wherein the step of computing a new color fluctuation metric includes the steps of: decomposing the halftone pattern $f_j$ into its component parts; converting the decomposed color components into a uniform color space; and filtering the converted decomposed color components.

14. The method recited in claim 13 wherein the halftone pattern $f_j$ is adjusted by adjusting the decomposed filtered color components.

15. The method recited in claim 13 wherein the uniform color space is a L*a*b colorspace.

16. The method recited in claim 15 wherein the luminance channel L has a weighting factor larger than channel a and channel b.

17. The method recited in claim 15 wherein the halftone pattern $f_j$ is converted into a L*a*b image using color measurement data.

18. The method recited in claim 13 wherein the filter used in the filtering step models the frequency response of the human visual system.

19. The method recited in claim 12, wherein the halftone pattern $f_j$ is adjusted by swapping the current pixel with a pixel in the halftone pattern $f_j$ to reduce the color fluctuation.

20. The method recited in claim 12 wherein the step of adjusting the halftone pattern $f_j$ includes the step of swapping to reduce color fluctuation, wherein the step of swapping to reduce color fluctuation is performed if the resultant color after swapping is a valid color, the stacking property is not violated, and the resulting color is on the permissible color list.

21. The method recited in claim 12, wherein after the halftone pattern $f_j$ is adjusted by toggling the current pixel to reduce the color fluctuation.

22. A printing system for generating a color halftone image comprised of a plurality of colors to produce a color image, said system comprising:

a first memory means for storing a primary color component for each pixel in the color image;

a second memory means for storing parameters of a plurality of dither matrices, a dither matrix corresponding to each of said color components, wherein the color fluctuation in each of the dither matrices is minimized; and a processor means coupled to the first memory means and the second memory means for comparing the dither matrices with each primary color component, wherein responsive to the comparison the primary color component is selected for printing.

23. A program storage medium readable by a computer, and storing a program of instructions executable by the computer to perform method steps for halftoning a color image, the method steps comprising:

generating a first halftone pattern having a plurality of colors;

minimizing the color fluctuation in the first halftone pattern for each of said plurality of colors; and generating a dither matrix for each of said plurality of colors, each of said dither matrices compared to the primary color component for each pixel in the color image, so as to select a primary color component to print.

* * * * *